(12) United States Patent
Robinson, Jr.

(10) Patent No.: US 12,393,876 B2
(45) Date of Patent: *Aug. 19, 2025

(54) SYSTEMS AND METHODS FOR AUTONOMOUSLY EXECUTING COMPUTER PROGRAMS

(71) Applicant: Curtis Ray Robinson, Jr., Rochester, NY (US)

(72) Inventor: Curtis Ray Robinson, Jr., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,231

(22) Filed: Nov. 6, 2023

(65) Prior Publication Data
US 2024/0070547 A1 Feb. 29, 2024

Related U.S. Application Data

(63) Continuation of application No. 17/233,421, filed on Apr. 16, 2021, now Pat. No. 11,809,971, which is a continuation of application No. 16/912,695, filed on Jun. 25, 2020, now Pat. No. 11,010,679.

(60) Provisional application No. 63/007,009, filed on Apr. 8, 2020.

(51) Int. Cl.
| | |
|---|---|
| *G06N 5/04* | (2023.01) |
| *G06N 3/08* | (2023.01) |
| *G06N 3/09* | (2023.01) |
| *G06N 20/00* | (2019.01) |
| *G06V 30/10* | (2022.01) |
| *G06V 30/19* | (2022.01) |

(52) U.S. Cl.
CPC ............ *G06N 20/00* (2019.01); *G06N 3/09* (2023.01); *G06N 5/04* (2013.01); *G06V 30/19173* (2022.01); *G06V 30/10* (2022.01)

(58) Field of Classification Search
CPC ................................. G06N 3/09; G06N 5/04
See application file for complete search history.

(56) References Cited

U.S. PATENT DOCUMENTS

| | | | |
|---|---|---|---|
| 2019/0250891 A1* | 8/2019 | Kumar | G06T 7/70 |
| 2019/0384699 A1* | 12/2019 | Arbon | G06N 3/006 |
| 2023/0142311 A1* | 5/2023 | Dauvin | G06F 11/302 |
| | | | 713/2 |

OTHER PUBLICATIONS

Moran, Kevin, et al. "Machine learning-based prototyping of graphical user interfaces for mobile apps." IEEE Transactions on Software Engineering 46.2 (2018): 196-221. (Year: 2018).*

* cited by examiner

*Primary Examiner* — Hal Schnee
(74) *Attorney, Agent, or Firm* — Cognition IP, P.C.; Edward Steakley; Saleh Kaihani

(57) ABSTRACT

Disclosed are systems and methods for autonomous computing replacing or augmenting a human user of computer programs, where access to internal operations of the computer program is not used. An application controller can use the display output of a computer program to determine a current state of the computer program, using the disclosed embodiments. For example, identity of menu options of the computer program can be determined from image frames obtained from the display output of the computer program and used to determine the current state of the computer program. The application controller can provide input commands to the computer program to execute the computer program from the current state to a destination state.

20 Claims, 10 Drawing Sheets

SYSTEMS AND METHODS FOR AUTONOMOUSLY EXECUTING COMPUTER PROGRAMS

CROSS-REFERENCE TO RELATED APPLICATIONS

This application is a continuation of and claims priority from U.S. patent application Ser. No. 17/233,421, filed on Apr. 16, 2021, which is a continuation of and claims priority from U.S. patent application Ser. No. 16/912,695, filed on Jun. 25, 2020, now U.S. Pat. No. 11,010,679, which claims priority from U.S. Provisional Application No. 63/007,009, filed on Apr. 8, 2020, entitled "SYSTEMS AND METHODS FOR AUTONOMOUS COMPUTING," all of which are hereby incorporated by reference in their entirety and should be considered a part of this specification.

BACKGROUND

Field

This invention relates generally to the field of artificial intelligence, and more particularly to using artificial intelligence and other techniques for autonomous computing.

Description of the Related Art

Computers have increasingly assumed an important role in modern life. For the most part, today's computer systems are used by humans. Humans provide input commands to a computer system, observe the output and potentially provide additional input commands depending on the tasks they wish the computer system to perform. With increased automation in various fields, and with increased contributions from artificial intelligence technology, it can be expected that computer systems of the future might autonomously manage other computing systems.

Currently systems exist that provide autonomous computing. For example, for some computer gaming programs, the program can be run in a mode that allows the computer to play against itself. A human user can view the game for entertainment or learning the game. Other applications exist that can provide user with subroutines that allow a series of commands to be performed in succession by a computer program, in effect, performing autonomous computing. However, such autonomous computing is provided by the developer of the computer program, who has access to the internal processes and operations of the computer program. Consequently, there is a need for systems and methods that allow autonomous computing, without necessarily, having access to internal operations of a computer program. Such autonomous computing can be deployed on more applications and on-demand for tasks or goals as the operator of the autonomous computing system may desire.

SUMMARY

In one aspect a method of autonomously executing a computer program is disclosed. The method includes: generating a goals file, comprising a plurality of mappings, wherein each mapping comprises mapping each goal to one or more input commands to the computer program corresponding to selecting one or more menu options of the computer program, navigating the computer program from a start state to an end state, wherein the end state comprises a state of the computer program having executed a goal; selecting a goal from the goals file; receiving a plurality of screenshots of the computer program; annotating the plurality of the screenshots, wherein the annotations comprise labeling menu options of the computer program; generating a position reference file comprising identities of menu options of the computer program and positions of the menu options of the computer program in output display of the computer program; training a classifier using the annotated screenshots to receive a screenshot and return a plurality of labels in the screenshot and positions of the labels in the screenshot; receiving a display output of the computer program, wherein the display output comprises image frames; using the trained classifier, determining the plurality of labels in the image frames; identifying menu options in the image frames based on the plurality of labels in the image frames and the position reference file; determining a current state of the computer program based at least partly on one or more of the plurality of labels in the image frames and the identified menu options; determining a start state in the goals file comprising the current state; determining a mapping in the goals file corresponding to the selected goal and the current state; and providing input commands in the determined mapping to the computer program.

In some embodiments, the labels comprise the annotations and wherein the annotations have an indication of identities of menu options of the computer program.

In one embodiment, the mapping in the goals file comprises a navigation input corresponding to each image frame.

In another embodiment, identifying the menu options in the image frames further comprises using optical character recognition.

In some embodiments, the classifier comprises one or more of machine learning, deep learning, neural networks, and convolutional neural networks.

In another embodiment, generating the position reference file comprises drawing regular or irregular geometric shapes around menu options in the plurality of the screenshots and recoding in the position reference file positions of the shapes in each screenshot and identities of the menu options in each shape.

In some embodiments, the menu options further comprise submenu menu options.

In one embodiment, identifying the menu options further comprises comparing the label positions returned by the trained classifier with the menu option positions in the position reference file to determine identities of menu options in the image frames.

In one embodiment, comparing further comprises determining an overlap, between a corresponding bounding box in the position reference file and a position of a label in the image frame, exceeding a predetermined threshold.

In another aspect, another method of autonomously executing a computer program is disclosed. The method includes: obtaining screenshots of output of the computer program; annotating display elements in the screenshots corresponding to menu options in the computer program; generating a goals file comprising a mapping of input commands to tasks executable by the computer program; generating a position reference file comprising positions of the display elements in the screenshots and further comprising identities of the display elements in the screenshots; training a classifier, using the annotated display elements to determine the display elements and display element positions in output image frames received from the computer program; determining a current state of the computer program, based on comparing output of the trained classifier with the position reference file; and generating input commands comprising commands to transition the computer program from the current state to a destination state, wherein the destination state comprises a chosen task to be executed by the computer program.

In some embodiments, annotating the display elements comprises labeling the menu options in the screenshots, wherein the labels comprise an indication of identities of the menu options.

In one embodiment, comparing the output of the trained classifier with the position reference file comprises determining an overlap, between a bounding box in the position reference file and a display element position returned by the trained classifier, exceeding a predetermined threshold.

In another embodiment, determining the current state of the computer program, comprises determining identities of the menu options in output image frames and determining which menu option is an active menu option in the output image frame.

In some embodiments, determining the current state of the computer program further comprises identifying active menu options in the output image frames.

In another embodiment, determining the current state of the computer program further comprises determining identities of one or more menu options using optical character recognition.

In another aspect, a non-transitory computer storage is disclosed. The non-transitory computer storage stores executable program instructions that, when executed by one or more computing devices, configure the one or more computing devices to perform operations including: obtaining screenshots of output of the computer program; annotating display elements in the screenshots corresponding to menu options in the computer program; generating a goals file comprising a mapping of input commands to tasks executable by the computer program; generating a position reference file comprising positions of the display elements in the screenshots and further comprising identities of the display elements in the screenshots; training a classifier, using the annotated display elements to determine the display elements and display element positions in output image frames received from the computer program; determining a current state of the computer program, based on comparing output of the trained classifier with the position reference file; and generating input commands comprising commands to transition the computer program from the current state to a destination state, wherein the destination state comprises a chosen task to be executed by the computer program.

In one embodiment, annotating the display elements comprises labeling the menu options in the screenshots, wherein the labels comprise an indication of identities of the menu options.

In another embodiment, comparing the output of the trained classifier with the position reference file comprises determining an overlap, between a bounding box in the position reference file and a display element position returned by the trained classifier, exceeding a predetermined threshold.

In some embodiments, determining the current state of the computer program, comprises determining identities of the menu options in output image frames and determining which menu option is an active menu option in the output image frame.

In one embodiment, determining the current state of the computer program further comprises identifying active menu options in the output image frames.

BRIEF DESCRIPTION OF THE DRAWINGS

These drawings and the associated description herein are provided to illustrate specific embodiments of the invention and are not intended to be limiting.

DETAILED DESCRIPTION

Figure 1:
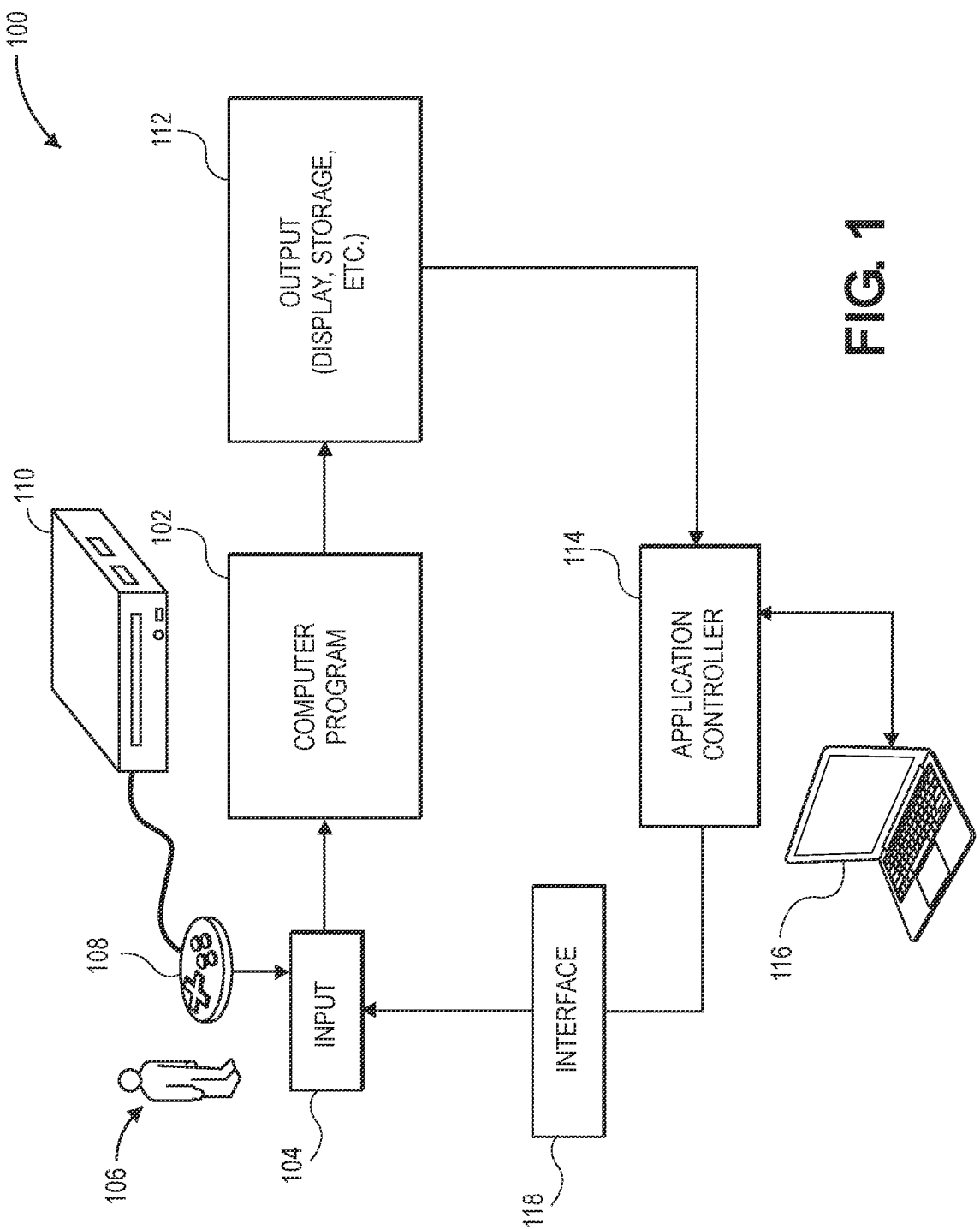
FIG. 1 illustrates a block diagram of an autonomous computing system, where an application controller can be used to control a computer program, without having access to the internal operations of the computer program.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Computers have increasingly assumed important roles in everyday life. With increased use of computers, automation has also become more of a possibility in many areas of modern life. One field of automation includes autonomous computing, where automation software can control the running and input stream of another computer program. An existing autonomous computing is, for example, a computer program that can play chess for both players without human intervention. The game can be observed by a human for education or entertainment purposes. Another example of autonomous computing includes use of subroutines and subprograms within a computing program to automate some tasks. For example, Microsoft® Word® allows users to define Macros. Macros can be a grouping of a series of commands or instructions for Microsoft® Word® to accomplish a task automatically. In this type of autonomous computing, a controller program has access to the internal operations of the program it is controlling. However, the need for autonomous computing can also exist in circumstances where access to the application program interfaces (APIs), protocols and general internal operations of a program is not available or cannot be easily or practically provided. In other words, autonomous computing can be substantially more useful and practical if a controller program can replace or augment the role of a human user of a program, without the need for access to the same internal operations of the program, which a developer of the program might have.

FIG. 1 illustrates a block diagram of an autonomous computing system 100, where an application controller 114 can be used to control a computer program 102, without having access to the internal operations of the computer program 102. The computer program 102 receives an input 104 and generates an output 112. The input 104 can be received from a human user 106 via an input device 108. The computer program 102 can run on a first computing device 110. The first computing device 110 can include for example, a special purpose computing device such as a gaming console (e.g., Nintendo, PlayStation, Xbox and others). The output 112 can be a display output on a monitor, TV, or other display devices, or it can be an output into a storage device such as a hard disk drive (HDD), flash drive or other short- or long-term memory device.

An application controller 114 can use an interface device 118 to provide inputs 104 to the computer program 102, in lieu of, or in addition to the inputs 104 provided by the human user 106. The application controller 114 can run on a second computing device 116. In some embodiments, the first and second computing devices 110 and 116 can be the same computing device, running both the computer program 102 and the application controller 114, albeit with neither program having access to the internal operations of the other. In other embodiments, the second computing device 116 can run on separate computing device than the first computing device 110. Example second computing devices 116 can include desktops, laptops, tablets, mobile devices or other computing devices capable of running the application controller 114 and using the interface device 118 to provide inputs 104. The application controller 114 can receive the output 112 and can base its operations on the analysis of the output 112, as described herein.

In one embodiment, the computer program 102 can be a computer game and the autonomous computing system 100 can be used to play the computer game by providing autonomous inputs to the computer program 102. In the cases where the first computing device 110 is a gaming console, the human user 106 can provide inputs via the input device 108 (such as a joystick, wireless or wired game controller or the like). The input device 108 can include buttons to provide directional inputs, navigational inputs, back button, info button, and other various buttons to provide input to the computer program 102 running on the first computing device 110. Similarly, application controller 114 can provide inputs to the first computing device 110 via an interface device 118. An example of the interface device 118 can include hardware, a microcontroller board such as those provided by Arduino (https://www.arduino.cc/). The interface device 118 can couple to the first computing device 110 running the computer program 102 via a connection accepted by the first computing device 110, for example, a universal serial bus (USB) connection or other standard or non-standard controller connections.

The application controller 114 can use a variety of tools, including computer vision, artificial intelligence-based classifiers, optical character recognition (OCR) and other tools to determine a current state of the computer program 102 relative to one or more goals of autonomous computing and provide corresponding inputs to the computer program 102 to achieve those goals. The computer program 102 can be a menu-driven computer program and inputs 104 can include navigational inputs to navigate between menu options of the computer program 102 and to select a menu option. The menu options of the computer program 102 can include selectable menu options and active selectable menu options, where the term "active" indicates a menu option that can be selectable by a confirmatory input 104. In some embodiments, the application controller 114 can generate or can be configured to include a goals file, where goals file can include one or more mappings of objectives or goals of the autonomous control of the computer program 102 and a series of commands to achieve those goals.

Figure 2:
FIG. 2 illustrates an example goals file for a computer program comprising a video game.

FIG. 2 illustrates an example goals file 200 for a computer program 102 comprising a video game, but the embodiment shown is extendable to other computer programs and applications. The goals file 200 can include a mapping of goals, current state of the computer program 102, active menu and a series of input commands to achieve a goal. A goal can include a start state in the computer program 102 and an end state of the computer program 102. In other words, a goal in the goals file 200 may be defined as navigating or commanding the computer program 102 to execute from a start state to an end state. In a menu-driven computer program (such as some strategy games or many computer applications), a task or a goal is accomplished by navigating between menu options to make a desired menu option an active menu option, and then selecting that menu option. The active menu option is where the cursor or mouse pointer is and can be indicated in various computer programs 102 with different user interface (UI) elements, such as highlighting, changing of color, font, changing of mouse pointer shape or other display indications. Menu options of computer program 102 can include selectable menu options and active selectable menu options.

A goal may be simple, such as moving a cursor from a first selectable menu item to a second selectable menu item to make the second selectable menu item active. For example, a goal maybe to move a cursor from an active menu item (e.g., the highlighted or selected menu) down to a fifth menu item option and then making the fifth menu item option active. Alternatively, a goal may be a complex series of navigation commands through pages, menus or submenus of the computer program 102.

When human user 106 provides the inputs 104, an input command received via a click of a mouse or a strike of a keyboard key or pressing a game controller button, can select the active menu option and accomplish a task. Those and similar commands received from the human user 106 can be generated by Application controller 114 to provide inputs 104 in an autonomous manner to the computer program 102.

The mapping of goals and commands in the goals file 200 can also include a mapping of those commands to various relevant screenshots in the output 112 of the computer program 102. In other words, the application controller 114 can determine based on the image frames generated in the output 112, and further based on the goal to be executed, which commands or series of commands (e.g., navigation inputs between menu and submenus) should be sent as input 104 to the computer program 102. In some embodiments, the mapping of image frames from the output in the goals file can also contribute to determining the current state of the computer program 102 and subsequently to a command or a series of commands relative to a goal in the goals file 200.

Figure 3:
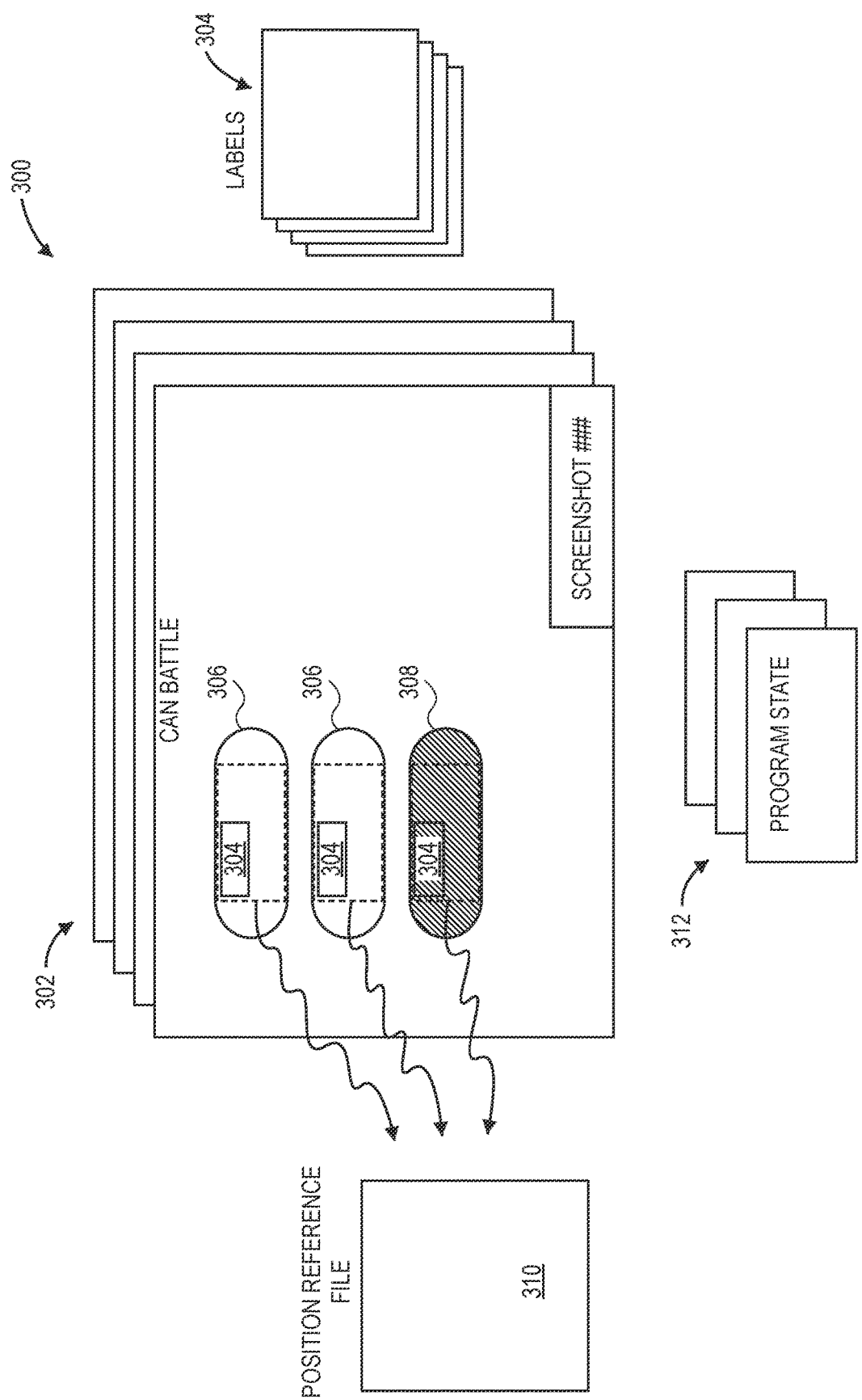
FIG. 3 illustrates a diagram of constructing training material for one or more artificial intelligence classifiers.

In some embodiments, various screenshots of the computer program 102 are obtained from the output 112 and used to train one or more artificial intelligence classifiers. FIG. 3 illustrates a diagram 300 of constructing training material for one or more artificial intelligence classifiers. Training screenshots 302 are obtained form the output 112 and annotated with one or more labels 304. The training screenshots 302 can include selectable menu options 306 and an active selectable menu option 308. In various training screenshots 302, different selectable menu options and active selectable menu options may appear. Various selectable menu options 306 and/or active selectable menu options 308 are annotated with labels 304. In some embodiments, the labels can have an indication of the content of their corresponding selectable menu options, but not the precise identity of the menu option. By defining the labels 304 at an appropriate level-of-abstraction, the training efficiency of the artificial intelligence classifiers can be increased. In other words, while it is possible to, in some embodiments, define labels 304 to correspond exactly with the identity of the selectable menu option, in some scenarios that can decrease the efficiency of the artificial intelligence classifiers to detect the same labels in screenshots with unknown labels. In other words, defining labels 304 to correspond exactly with the identity of menu options of the computer program 102 can lead to too many labels for artificial intelligence technology to efficiently and accurately identify them in screenshots with unknown labels. In the embodiments, where the labels 304 have an indication of identity of a corresponding menu option of the computer program 102 (but not necessarily the exact identity), the screenshots can also be used to generate a position reference file 310 from which the identity of a menu option can be derived.

The position reference file 310 can include the identity of the selectable menu options 306 and active selectable menu option 308 (for example, their exact identity or an identity more precisely defined than those defined by labels 304), as well as the coordinates of those menu options in the training screenshots 302. Various techniques and tools can be used to generate the position reference file 310. For example, in some embodiments, bounding boxes in rectangle from can be drawn around various display elements of the training screenshots 302 and the corresponding coordinates of the bounding boxes relative to some reference point (e.g., the center of the training screenshots 302 or a corner of the training screenshots 302) can be obtained and used to generate the position reference file 310. The bounding boxes can assume other regular or irregular geometric shapes.

In some embodiments, the training material in diagram 300 can further include a program current state 312 associated with a training screenshot 302, so the artificial intelligence classifiers can also determine the current state of the computer program 102. Examples of various current states of the computer program 102 can depend on its type and its operations. Some example current states include, the welcome screen of an application, title screen of a game application or any other screen the computer program 102 can output to output 112 after reaching steady state (e.g., after having executed a command).

Figure 4:
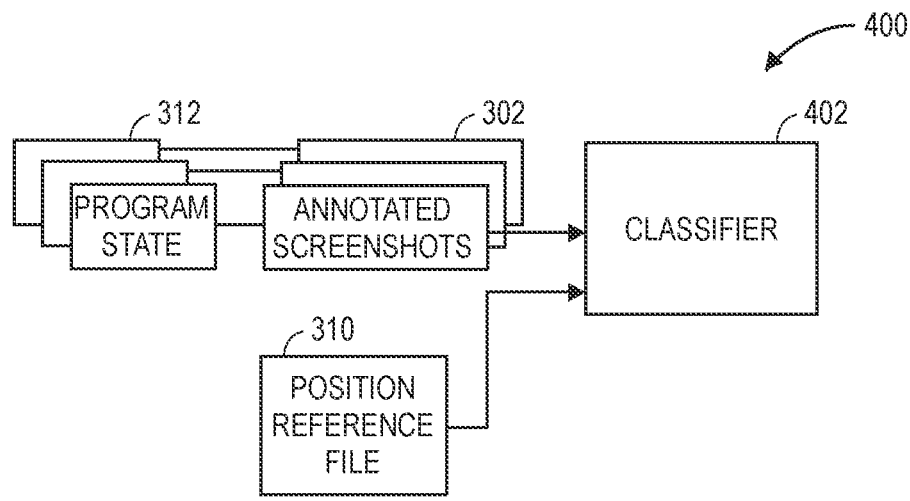
FIG. 4 illustrates a block diagram of the training of a classifier.

FIG. 4 illustrates a block diagram 400 of the training of a classifier 402. The classifier 402 can be implemented with a variety of artificial intelligence techniques and networks, including for example, machine learning, neural networks, deep neural networks, convolutional neural networks (CNNs), and others. As described above, the classifier 402 can be trained with annotated training screenshots 302 (along with associated current program states 312) and the position reference file 310. A trained classifier 402 can receive a screenshot and output labels 304 and a current program state associated with the screenshot.

Figure 5:
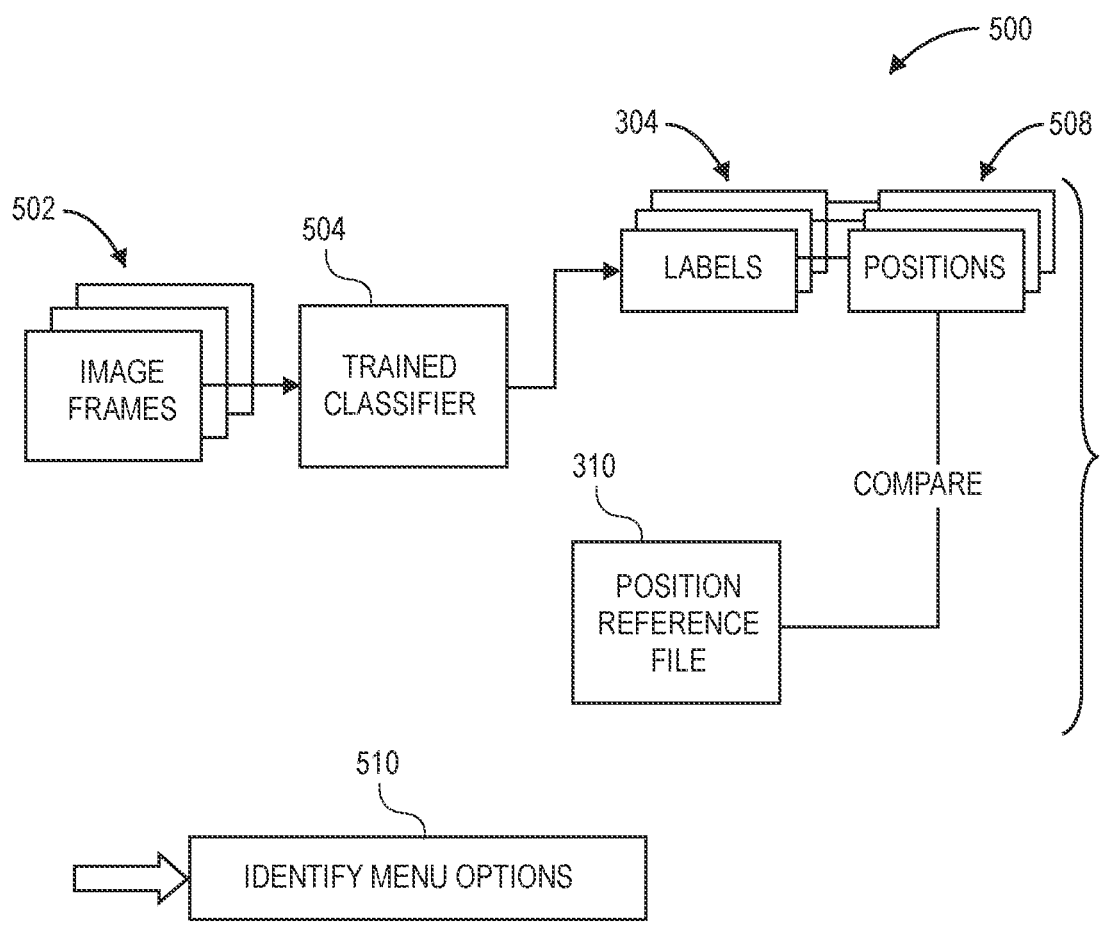
FIG. 5 illustrates a diagram of obtaining identities of selectable menu options in a screenshot of a computer program and determining an active menu option in the screenshot.

FIG. 5 illustrates a diagram 500 of obtaining the identities of selectable menu options in a screenshot and determining an active menu option in the screenshot. Image frames from the output 112 are fed through a trained classifier 504, which has been configured and trained according to the embodiments described herein. The trained classifier 504 outputs the labels 304 that it can find in the image frames 502, along with the positions 508 of the labels 304 in the image frames 502. The positions 508 are then compared against the position reference file 310 to determine the identities 510 of the selectable menu option or active selectable menu option corresponding to the labels 304. In some embodiments, OCR techniques can be used in addition to or in lieu of the techniques described above to further confirm the identities 510 of display elements of image frames 502.

The comparison performed in diagram 500 can include determining an amount of overlap between the position of a label 304, as reported by the trained classifier 504 and the position of a corresponding bounding box (or other regular or irregular geometric shape if used) in the position reference file 310. If an amount of overlap between the position of a label 304 and the position of a known shape prerecorded in the position reference file 310 is above a predetermined threshold, the identified label 304 is determined to be the selectable menu option or submenu option indicated by the shape in the position reference file 310. The predetermined threshold can depend on the computer program 102 and its user interface (UI) layout. For example, some computer programs 102 have a dense menu layout, while others might separate out the menu options with larger fonts and separation spaces. For computer programs 102, which use denser menu options, a threshold of 70% or higher may be defined, while lower thresholds can be used for computer programs 102 that use a more spaced menu option layout. The position reference file 310 includes position and identity information regarding the selectable menu and/or submenu options of the computer program 102, as well as their relative positioning.

The application controller 114 can also be configured to handle depth that might exists within the selectable menu options of the computer program 102. The term depth can refer to the situation where the selectable menu options of the computer program 102 can have nested selectable menu option elements. Various components and data structures of the application controller 114 can take into account and track depth in selectable menu options. For example, the goals file 200 can include the mapping of navigation inputs through submenu selectable menu options. The training screenshots 302 can be further annotated with submenu selectable menu options if it is applicable. Furthermore, the classifier 402 can be trained to detect labels 304 corresponding to selectable menu options, active selectable menu options within menu or submenu options of the computer program 102.

In some embodiments, the selectable menu options of the computer program 102 may follow a tree-like structure, such that navigating to a final program state depends on a root choice and the navigation choices made earlier. The classifier 402 can be trained to identify labels 304 within selectable menu and submenu options of the computer program 102, which may appear in a tree-like structure.

Similarly, during training of the classifier 402, the labels 304, the position reference file 310 (and bounding boxes and coordinates therein) and the current program states 312 can include permutations and possibilities encompassing navigating through selectable menu and submenu options relative to the goals that may be present in the goals file 200. Additionally, in some embodiments, OCR techniques can also be used to further identify selectable submenu options.

Given the embodiments described above, the application controller 114 can determine a current state of the computer program 102, including which selectable menu options are available and which ones are active. When a goal from the goals file 200 is chosen, the application controller 114 can determine the mapping of navigation and input commands (through selectable menu and submenu options) to transition the computer program 102 from the current state to a state where the chosen goal (or task) is accomplished or executed by the computer program 102. As an example, if the computer program 102 is the Pokémon® game, the same submenu that allows for checking a Monster's information can also be used and may be the same menu option used to perform swapping Pokémon® option. The application controller 114 can determine the current state of the game and the active selectable menu or submenu option to provide the relevant input command to the computer program 102 based on a chosen goal from the goals file 200.

Figure 6:
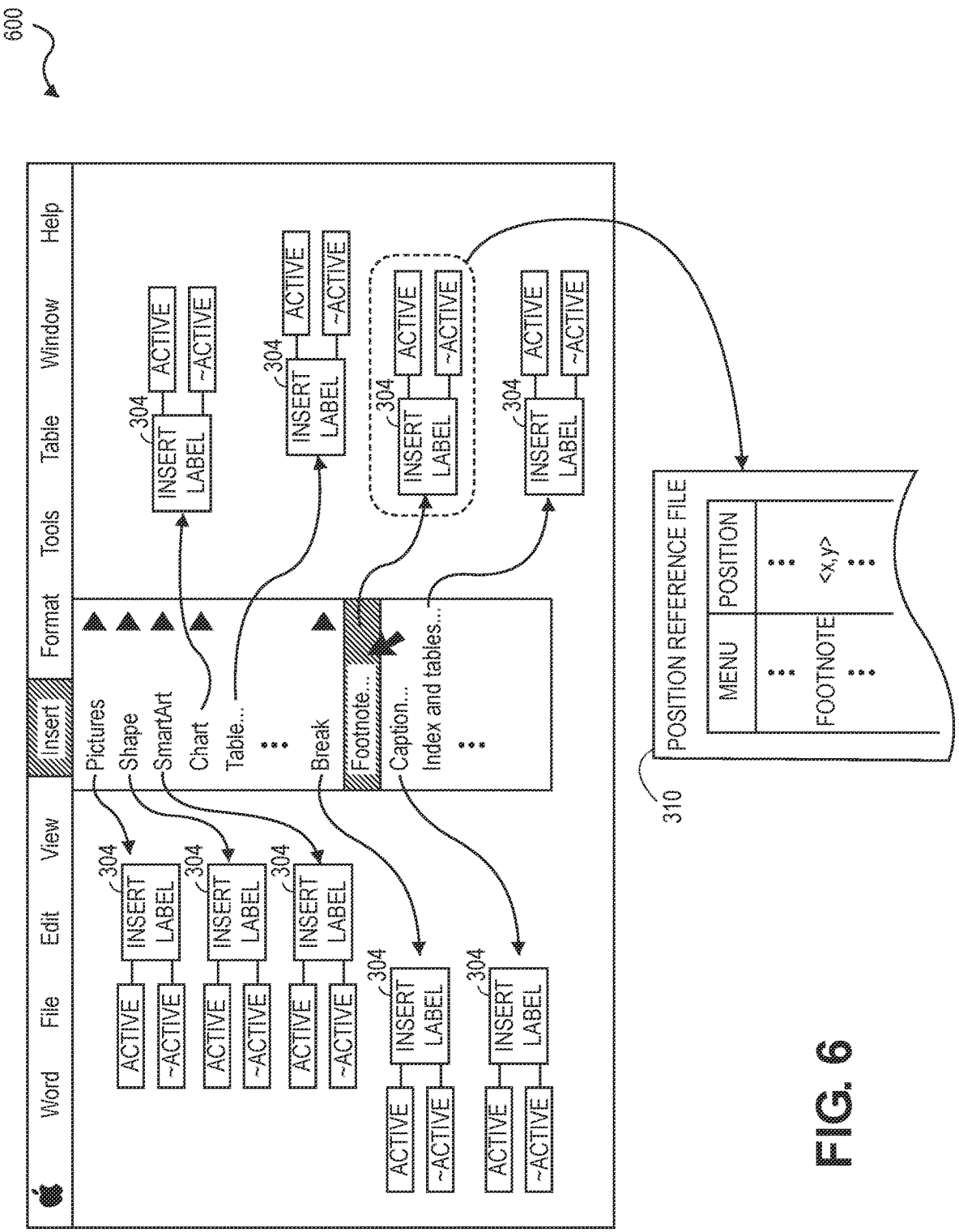
FIG. 6 illustrates an image frame, which can be analyzed by the application controller of the embodiment of FIG. 1 in order to identify an active selectable menu option and perform autonomous computing tasks.

FIG. 6 illustrates an image frame 600, which can be analyzed by the application controller 114 in order to identify an active selectable menu option and perform autonomous computing tasks. In the example shown, the computer program 102 is Microsoft® Word® in Apple® environment. The application controller 114 can determine a current state of the computer program 102 in this instance by determining that selectable submenu option "Footnote" of the selectable menu option "Insert" is the active selectable submenu option indicating a current state of the computer program 102. From that determination, the application controller 114 can provide further input commands to the computer program 102 to cause the computer program 102 to perform tasks that may have been outlined in the goals file 200.

In the example shown, labels 304 can be defined in a variety of ways. As described earlier, to avoid creating too many labels that might reduce the efficiency of classifiers 402, 504, the labels 304 can be defined at an appropriate level of abstraction. For example, the labels 304 can be defined at the level of the main menu options, such as the Apple® logo, "Word," "File," . . . , "Insert," "Format," . . . , "Help". The classifier 402 can be trained on these labels 304. When image frame 600 is input to the trained classifier 504, the classifier 504 can determine that the image frame 600 contains a series of "Insert" labels 304 corresponding to the "Insert" submenu items that exist in image frame 600 (e.g., "Pictures," "Shape," "Smartart," "Chart," "Table . . . ," "Break," "Footnote . . . ," "Caption," "Index and tables," and others). Furthermore, the trained classifier 504 can append the "Insert" labels 304 with meta data, e.g., tags, indicating whether the "Insert" label 304 corresponds to a submenu option that is active or not active. In the example shown, the "Footnote . . . " submenu option is active. The mouse pointer is pointing at it and it is highlighted. Therefore, the trained classifier 504 tags the "Insert" label 304 corresponding to the "Footnote . . . " submenu as active. The trained classifier 504 additionally returns a position (e.g., coordinates) for each detected "Insert" label 304.

At the same time, the position reference file 310 can include pre-recorded position information as well as the precise identity of various menu and submenu options of the computer program 102. For example, the position reference file 310 can include this information in the form of a table, maintaining a mapping of menus and submenus of the program 102 with their position (e.g., coordinates) in the output 112. Referencing the example shown in FIG. 6, the positioning returned from the trained classifier 504 can be looked up in the table of the position reference file 310 (e.g. by further narrowing down the comparison with searching the positioning of submenus under the "Insert" menu option) to determine that the detected active "Insert" label 304 corresponds to the "Footnote . . . ," submenu.

With determining the Active menu or submenu option, a current state of the computer program 102 is also determined. The same process of comparing positions returned from the trained classifier 504 with the positions in position reference file 310 can be used to determine the identity of other relevant menu options in relation to a task or goal to be performed by the computer program 102. For example, if a selected goal from the goals file 200 is to navigate from the "Footnote . . . " submenu to the "Table . . . " submenu and insert a table in the document, the application controller 114 can determine the identities of the other "Insert" submenu options and determine the corresponding input commands to cause the computer program 102 to accomplish that task (e.g., command=navigate 4 menu positions up and choose select). In some embodiments, the Application controller 114 can repeat the menu item identification process described above to verify that its input commands were accurate or that they were executed accurately. In other embodiments, OCR techniques can be used as well or instead to confirm that the correct navigation was performed or that the correct input commands were received and were correctly executed.

Figure 7:
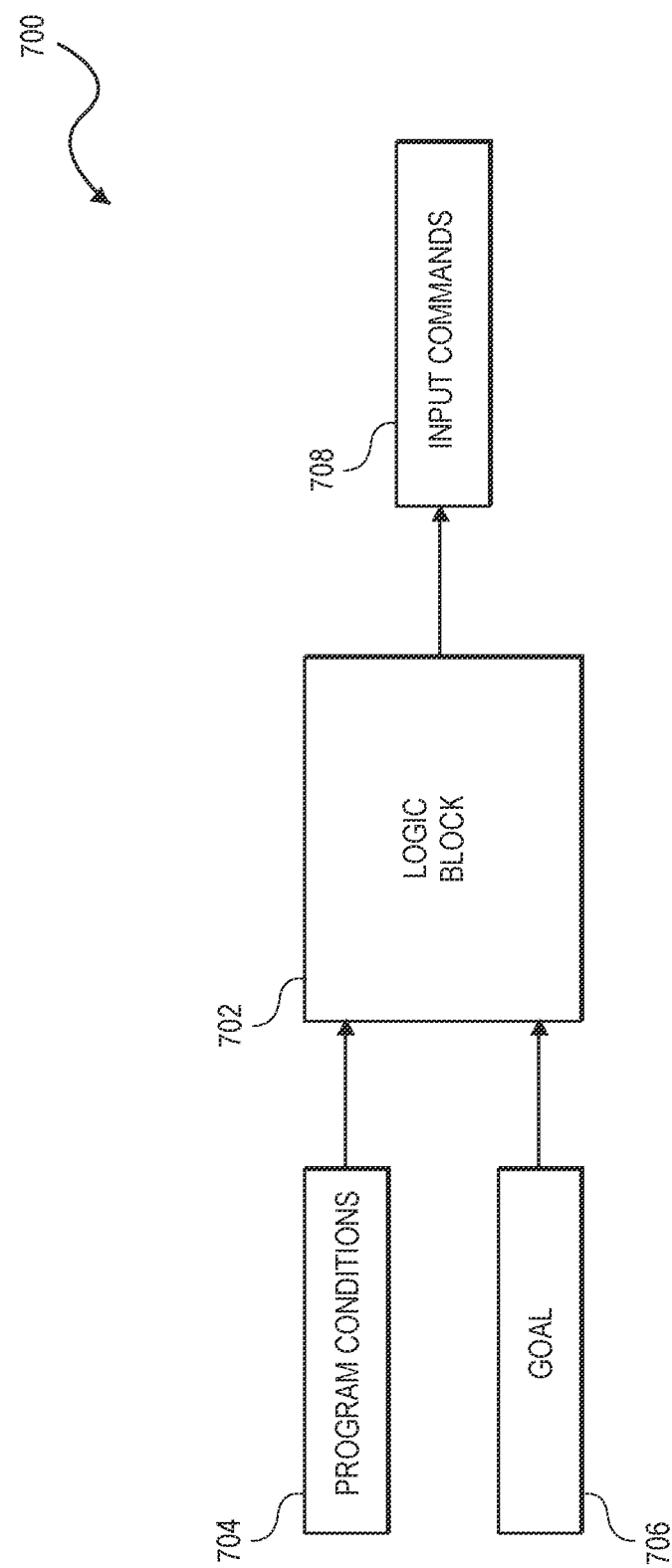
FIG. 7 illustrates a diagram of a logic block of the application controller of the embodiment of FIG. 1.

FIG. 7 illustrates a diagram 700 of a logic block of the application controller 114. The described embodiments of menu item identification can enable the application controller 114 to detect a current state of the computer program 102 (including the menu and submenu options and their positioning). In some embodiments, the application controller 114 can include a logic block 702, which can receive the program conditions 704 of the computer program 102 and one or more goals 706. The logic block 702 can then return a series of input commands 708 to achieve the goal 706. The program conditions 704 can include the current active menu and other menu options accessible from the current active menu option, as well as other program conditions that may be relevant to accomplishing the goal 706. In some embodiments, the logic block 702 can be programmed and configured to determine a series of navigational and/or input commands to transition the computer program 102 from a current state to a destination state to accomplish the goal 706. In some embodiments, each navigational and/or command input corresponds to an image frame outputted by the computer program 102. In other words, an output image frame can be analyzed in the application controller 114 and used to generate or find a corresponding navigational and/or input command relative to a predefined goal. The navigational and/or input command is then provided to the computer program 102, as if a human being had provided the input.

Figure 8:
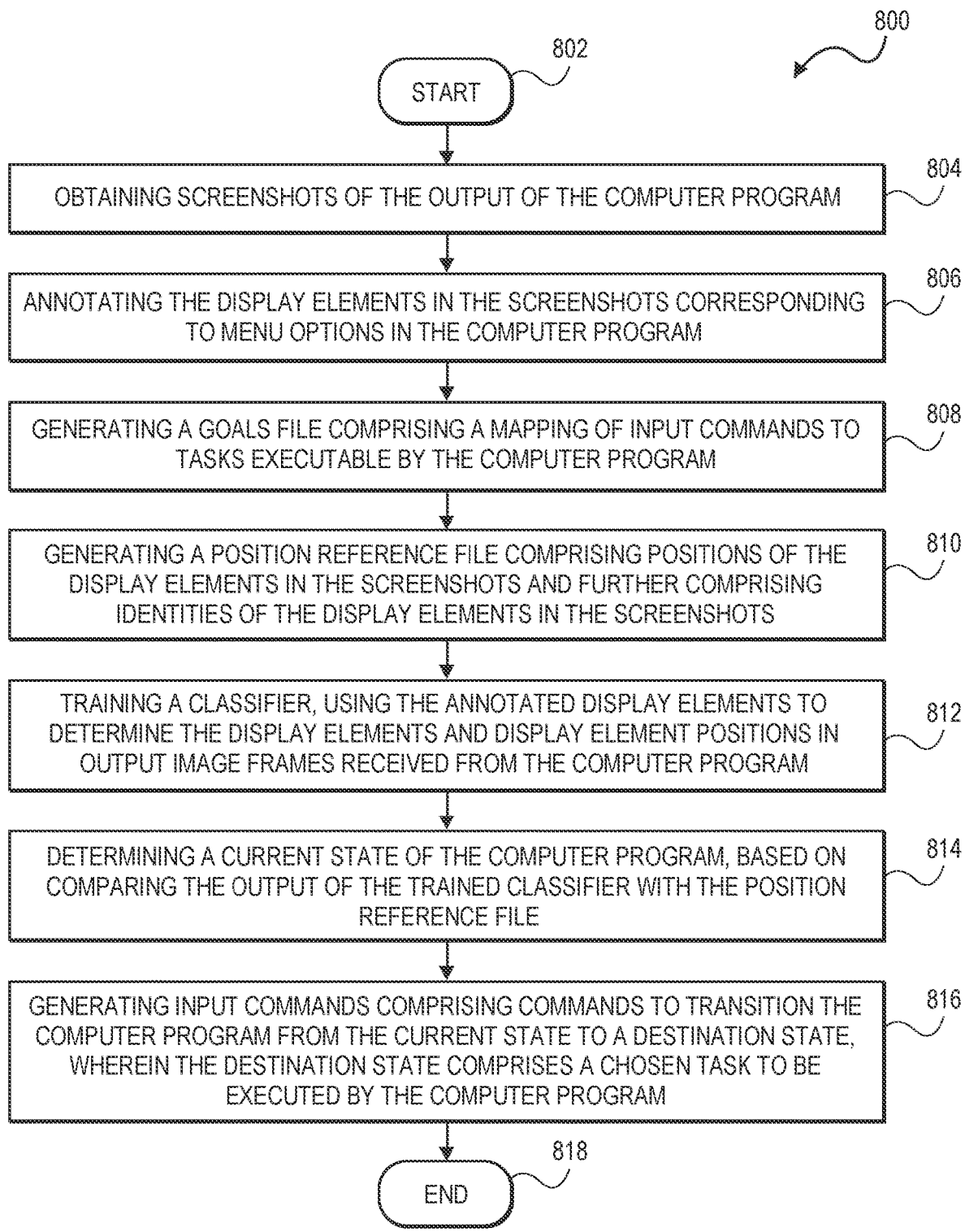
FIG. 8 illustrates a flowchart of a method of autonomously executing a computer program according to an embodiment.

FIG. 8 illustrates a flowchart of a method 800 of autonomously executing a computer program according to an embodiment. The method starts at step 802. The step 804 includes obtaining screenshots of the output of the computer program. The step 806 includes annotating the display elements in the screenshots corresponding to menu options in the computer program. The step 808 includes generating a goals file comprising a mapping of input commands to tasks executable by the computer program. The step 810 includes generating a position reference file comprising positions of the display elements in the screenshots and further comprising identities of the display elements in the screenshots. The step 812 includes training a classifier, using the annotated display elements to determine the display elements and display element positions in output image frames received from the computer program. The step 814 includes determining a current state of the computer program, based on comparing the output of the trained classifier with the position reference file. The step 816 includes generating input commands comprising commands to transition the computer program from the current state to a destination state, wherein the destination state comprises a chosen task to be executed by the computer program. The method 800 ends at step 818.

Figure 9:
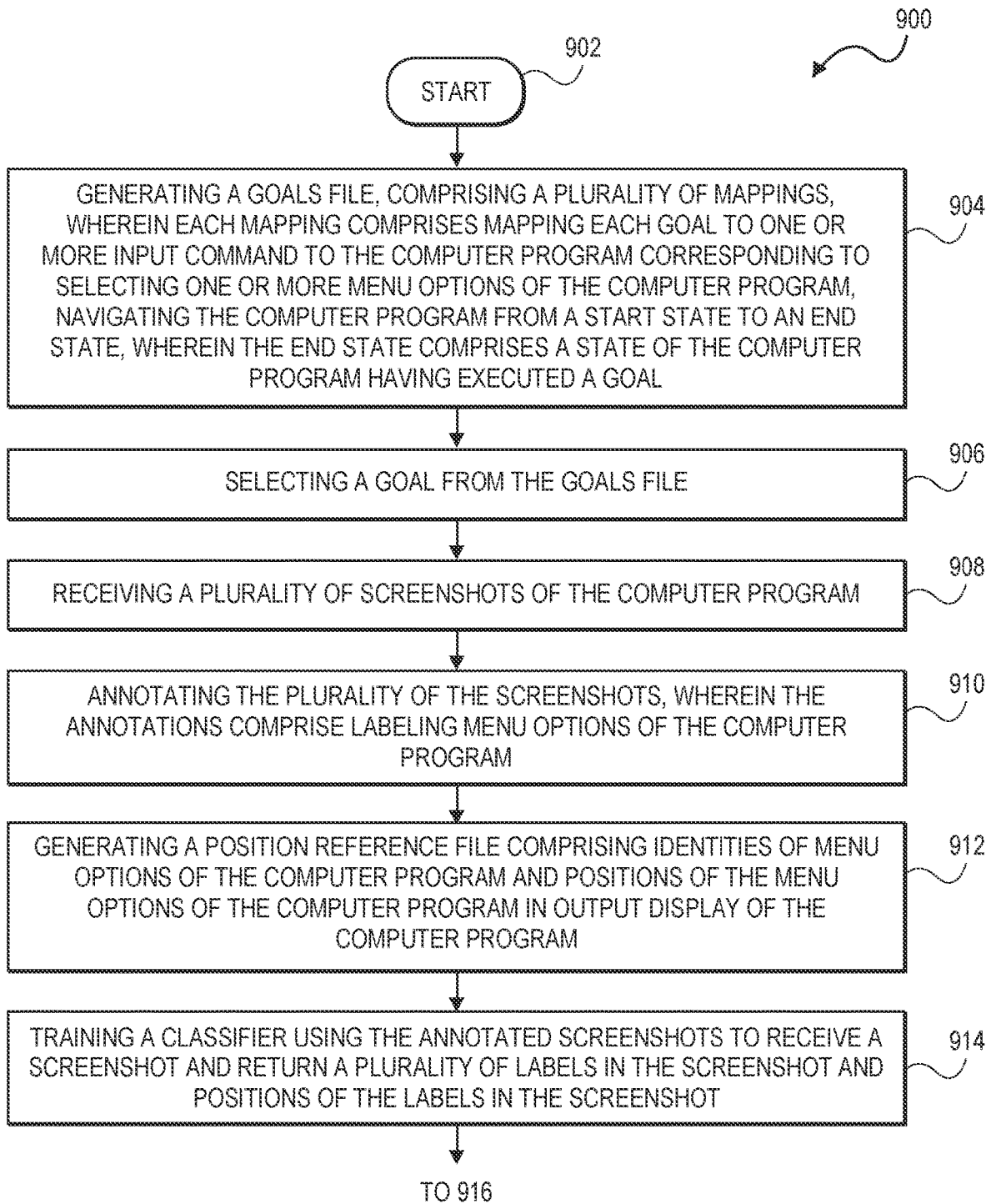
FIG. 9 illustrates a flowchart of a method of autonomously executing a computer program according to another embodiment.
Figure 9:
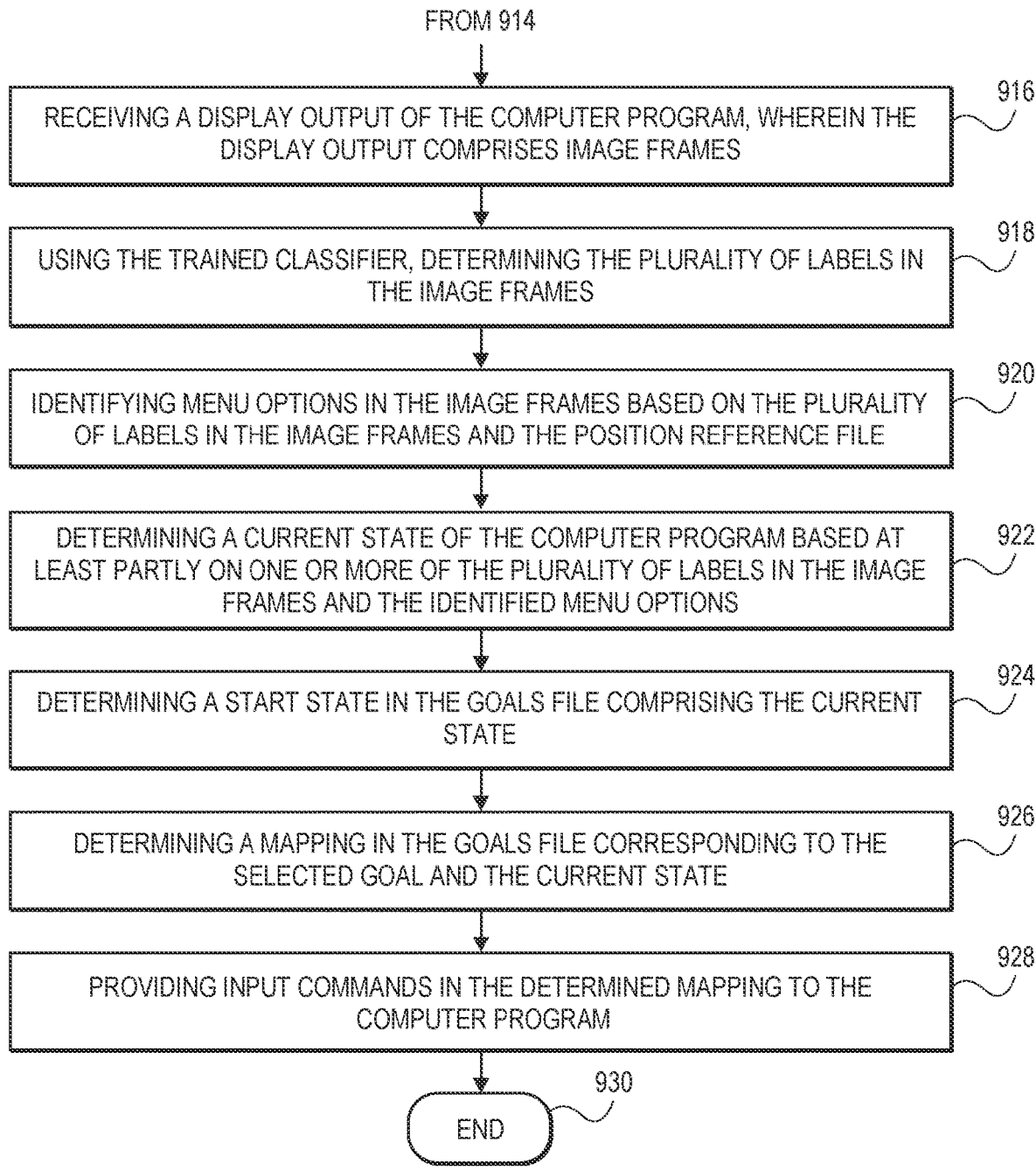

FIG. 9 illustrates a flowchart 900 of another method of autonomously executing a computer program. The method starts at step 902. Step 904 includes generating a goals file, comprising a plurality of mappings, wherein each mapping comprises mapping each goal to one or more input command to the computer program corresponding to selecting one or more menu options of the computer program, navigating the computer program from a start state to an end state, wherein the end state comprises a state of the computer program having executed a goal. Step 906 includes selecting a goal from the goals file. Step 908 includes receiving a plurality of screenshots of the computer program. Step 910 includes annotating the plurality of the screenshots, wherein the annotations comprise labeling menu options of the computer program. Step 912 includes generating a position reference file comprising identities of menu options of the computer program and positions of the menu options of the computer program in output display of the computer program. Step 914 includes training a classifier using the annotated screenshots to receive a screenshot and return a plurality of labels in the screenshot and positions of the labels in the screenshot.

Step 916 includes receiving a display output of the computer program, wherein the display output comprises images frames. Step 918 includes using the trained classifier to determine the plurality of labels in the image frames. Step 920 includes identifying menu options in the image frames based on the plurality of labels in the image frames and the position reference file. Step 922 includes determining a current state of the computer program based at least partly on one or more of the plurality of labels in the image frames and the identified menu options. Step 924 includes determining a start state in the goals file comprising the current state. Step 926 includes determining a mapping in the goals file corresponding to the selected goal and the current state. Step 928 includes providing input commands in the determined mapping to the computer program. The method 900 ends at step 930.

Some embodiments are implemented by a computer system. A computer system may include a processor, a memory, and a non-transitory computer-readable medium. The memory and non-transitory medium may store instructions for performing methods and steps described herein.

Figure 10:
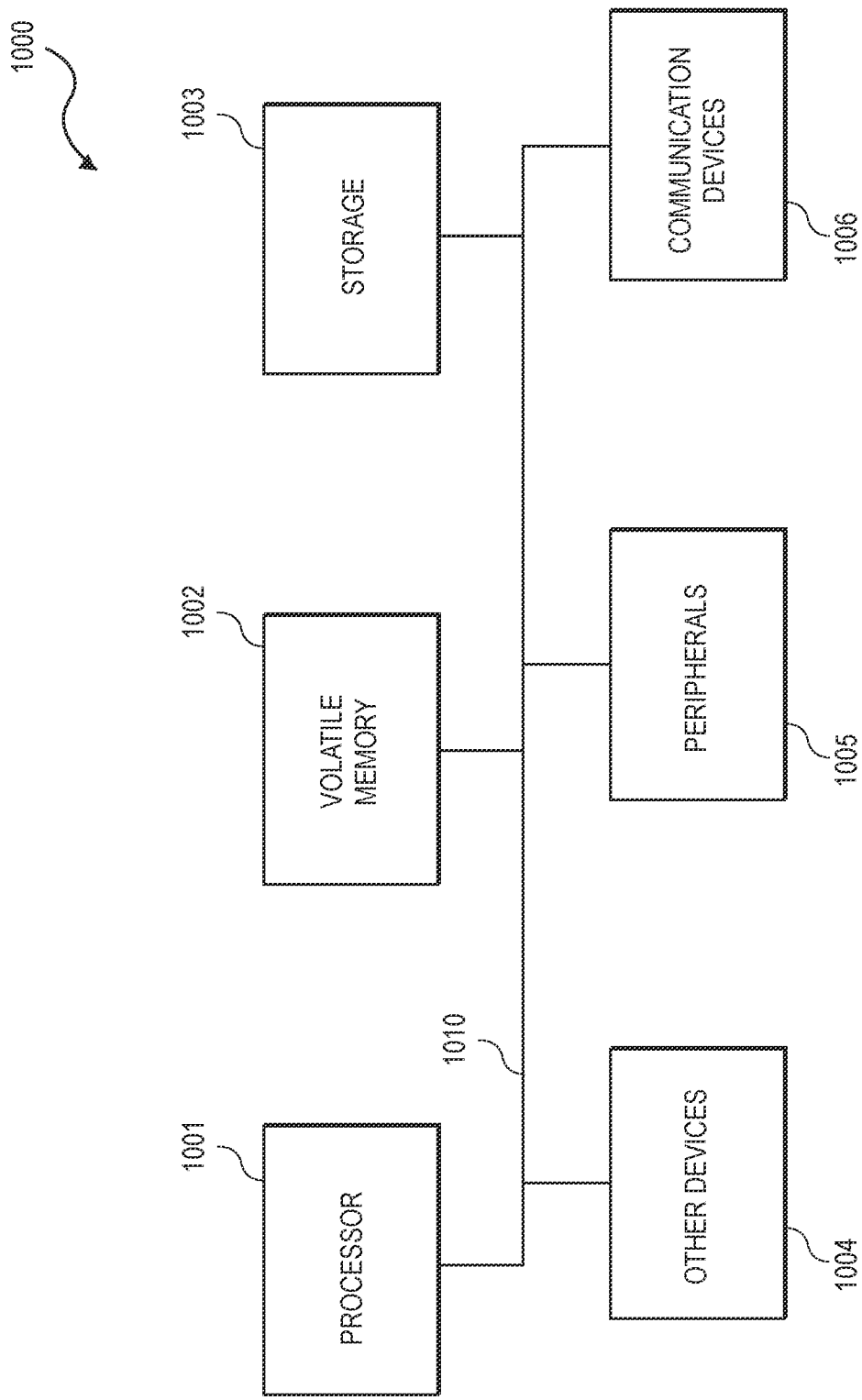
FIG. 10 illustrates an environment in which some embodiments may operate.

FIG. 10 illustrates one environment in which some embodiments may operate. Exemplary computer 1000 may perform operations consistent with some embodiments. The architecture of computer 1000 is exemplary. Computers can be implemented in a variety of other ways. A wide variety of computers can be used in accordance with the embodiments herein.

Processor 1001 may perform computing functions such as running computer programs. The volatile memory 1002 may provide temporary storage of data for the processor 1001. Random access memory (RAM) is one kind of volatile memory. Volatile memory typically requires power to maintain its stored information. Storage 1003 provides computer storage for data, instructions, and/or arbitrary information. Non-volatile memory, which can preserve data even when not powered and including disks and flash memory, is an example of storage. Storage 1003 may be organized as a file system, database, or in other ways. Data, instructions, and information may be loaded from storage 1003 into volatile memory 1002 for processing by the processor 1001.

The computer 1000 may include peripherals 1005. Peripherals 705 may include input peripherals such as a keyboard, mouse, trackball, joystick, game controller, video camera, microphone, speech to text devices and other input devices. Peripherals 1005 may also include output devices such as a display. Peripherals 1005 may include removable media devices such as CD-R and DVD-R recorders/players. Communications device 1006 may connect the computer 1000 to an external medium. For example, communications device 1006 may take the form of a network adapter that provides communications to a network. A computer 1000 may also include a variety of other devices 1004. The various components of the computer 1000 may be connected by a connection medium 1010 such as a bus, crossbar, or network.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
   receiving labeled menu options of a computer program, wherein the labels comprise general identities of the menu options of the computer program;
   using the labeled menu options, training a classifier to receive a first image frame from the computer program and output general identities and positions of the menu options in the first image frame;
   receiving a second image frame from the computer program;
   using the trained classifier, determining the general identities of the menu options and positions of the menu options in the second image frame;
   determining, based at least in part on the general identities and the positions, precise identities of the menu options in the second image frame; and
   providing input commands to the computer program, based at least in part on the precise identities of the menu options in the second image frame.

2. The method of claim 1, wherein the received labeled menu options are generated by annotating one or more screenshots of output of the computer program with the general identities of the menu options.

3. The method of claim 1, further comprising generating a position reference file, comprising positions of the menu options in one or more example outputs of the computer program, and precise identities of the menu options in the one or more example outputs, wherein the position reference file comprises a table of precise identities of the menu options mapped to the positions of the menu options in the example outputs, wherein the table is searchable based on general identities of the menu options, wherein determining the precise identities of the menu options in the second image frame further comprises:
    searching the position reference file for the general identities of the menu options in the second image frame;
    matching the positions returned by the trained classifier to the positions recorded in the position reference file; and
    returning the precise identities of the menu options in the second image frame, based on the matched positions.

4. The method of claim 1, further comprising:
    training the classifier to detect an active menu option;
    detecting the active menu option in the second image frame; and
    providing input commands, based at least in part on the active menu option.

5. The method of claim 1, wherein providing input commands comprises:
    providing a first input command;
    verifying the general and precise identities of menu options in the second image frame by redetermining the general and precise identities of the menu options in the second image frame; and
    providing a second input command based on the verification.

6. The method of claim 1, further comprising:
    determining a current state of the computer program, based at least in part on the precise identities of the menu options in the second image frame, wherein providing the input commands is further based on the current state of the computer program.

7. The method of claim 1, wherein the input commands comprise navigation commands, transitioning the computer program from a start state to an end state, executing one or more tasks by the computer program.

8. The method of claim 1, further comprising:
    receiving one or more program conditions of the computer program; and
    relative to one or more objectives, generating the input commands, wherein executing the input commands, by the computer program, accomplishes the one or more objectives.

9. The method of claim 1, further comprising:
    receiving one or more program conditions of the computer program, the conditions comprising one or more of: an active menu option and available non-active menu options; and
    relative to one or more objectives, generating the input commands, wherein executing the input commands, by the computer program, accomplishes the one or more objectives.

10. The method of claim 1, wherein the classifier comprises an artificial intelligence-based classifier.

11. A non-transitory computer storage that stores executable program instructions that, when executed by one or more computing devices, configure the one or more computing devices to perform operations comprising:
    receiving labeled menu options of a computer program, wherein the labels comprise general identities of the menu options of the computer program;
    using the labeled menu options, training a classifier to receive a first image frame from the computer program and output general identities and positions of the menu options in the first image frame;
    receiving a second image frame from the computer program;
    using the trained classifier, determining the general identities of the menu options and positions of the menu options in the second image frame;
    determining, based at least in part on the general identities and the positions, precise identities of the menu options in the second image frame; and
    providing input commands to the computer program, based at least in part on the precise identities of the menu options in the second image frame.

12. The non-transitory computer storage of claim 11, wherein the received labeled menu options are generated by annotating one or more screenshots of output of the computer program with the general identities of the menu options.

13. The non-transitory computer storage of claim 11, wherein the operations further comprise: generating a position reference file, comprising positions of the menu options in one or more example outputs of the computer program, and precise identities of the menu options in the one or more example outputs, wherein the position reference file comprises a table of precise identities of the menu options mapped to the positions of the menu options in the example outputs, wherein the table is searchable based on general identities of the menu options, wherein determining the precise identities of the menu options in the second image frame further comprises:
    searching the position reference file for the general identities of the menu options in the second image frame;
    matching the positions returned by the trained classifier to the positions recorded in the position reference file; and
    returning the precise identities of the menu options in the second image frame, based on the matched positions.

14. The non-transitory computer storage of claim 11, wherein the operations further comprise:
    training the classifier to detect an active menu option;
    detecting the active menu option in the second image frame; and
    providing input commands, based at least in part on the active menu option.

15. The non-transitory computer storage of claim 11, wherein providing input commands comprises:
    providing a first input command;
    verifying the general and precise identities of menu options in the second image frame by redetermining the general and precise identities of the menu options in the second image frame; and
    providing a second input command based on the verification.

16. The non-transitory computer storage of claim 11, wherein the operations further comprise:
    determining a current state of the computer program, based at least in part on the precise identities of the menu options in the second image frame, wherein providing the input commands is further based on the current state of the computer program.

17. The non-transitory computer storage of claim 11, wherein the input commands comprise navigation commands, transitioning the computer program from a start state to an end state, executing one or more tasks by the computer program.

18. The non-transitory computer storage of claim 11, wherein the operations further comprise:
   receiving one or more program conditions of the computer program; and
   relative to one or more objectives, generating the input commands, wherein executing the input commands, by the computer program, accomplishes the one or more objectives.

19. The non-transitory computer storage of claim 11, wherein the operations further comprise:
   receiving one or more program conditions of the computer program, the conditions comprising one or more of: an active menu option and available non-active menu options; and
   relative to one or more objectives, generating the input commands, wherein executing the input commands, by the computer program, accomplishes the one or more objectives.

20. The non-transitory computer storage of claim 11, wherein the classifier comprises an artificial intelligence-based classifier.

\* \* \* \* \*